United States Patent [19]

Amemiya et al.

[11] Patent Number: 4,697,114
[45] Date of Patent: Sep. 29, 1987

[54] PERMANENT-MAGNET ROTOR SHRINK-FIT ASSEMBLY

[75] Inventors: Yoichi Amemiya; Masatoyo Sogabe; Kiyoshi Tagami, all of Hachioji, Japan

[73] Assignee: Fanuc Ltd., Yamanashi, Japan

[21] Appl. No.: 933,643

[22] PCT Filed: Feb. 28, 1986

[86] PCT No.: PCT/JP86/00101
§ 371 Date: Oct. 27, 1986
§ 102(e) Date: Oct. 27, 1986

[87] PCT Pub. No.: WO86/05332
PCT Pub. Date: Sep. 12, 1986

[30] Foreign Application Priority Data

Feb. 28, 1985 [JP] Japan .................................. 60-37650

[51] Int. Cl.$^4$ ...................... H02K 15/02; H02K 21/14
[52] U.S. Cl. ...................................... 310/156; 310/42; 310/261; 29/598
[58] Field of Search .............. 310/40 MM, 42, 43, 156, 310/261; 29/598

[56] References Cited

U.S. PATENT DOCUMENTS

| | | | |
|---|---|---|---|
| 3,908,265 | 9/1975 | Heil et al. | 310/42 |
| 3,937,993 | 2/1976 | Noodleman | 310/46 |
| 3,979,821 | 9/1976 | Noodleman | 310/42 |
| 4,151,430 | 4/1979 | Stark | 310/42 |

Primary Examiner—Patrick R. Salce
Assistant Examiner—D. L. Rebsch
Attorney, Agent, or Firm—Armstrong, Nikaido, Marmelstein & Kubovcik

[57] ABSTRACT

A permanent magnet rotor assembly has a rotor shaft (11), and a plurality of yokes (12) extended along the axis of the rotor shaft at circumferential intervals around the rotor shaft. Permanent magnets (13) extended along the axis of the rotor shaft are held between two adjacent yokes. A pair of end plates (14, 15) attached to the axially opposite ends of the yokes are formed of a nonmagnetic material. Bosses (14a, 15a) fitting the outer circumference of the rotor shaft are formed in the respective central portions of the end plates. The bosses of the end plates are secured to the outer circumference of the rotor shaft by the compressive force of fastening rings (18, 19) mounted on the bosses by thermal shrinkage insertion.

4 Claims, 3 Drawing Figures

PERMANENT-MAGNET ROTOR SHRINK-FIT ASSEMBLY

DESCRIPTION

1. Technical Field

The present invention relates to a permanent-magnet rotor assembly and, more specifically, to improvements in a fastening structure for fastening end plates to the rotor shaft of a permanent-magnet rotor assembly.

2. Background Art

Generally, a permanent-magnet rotor assembly comprises a rotor shaft, a plurality of yokes extending along the axis of the rotor shaft and arranged around the rotor shaft at circumferential intervals, permanent magnets each being held between the two adjacent yokes, and a pair of end plates attached to the opposite ends of the yokes and fastened to the rotor shaft, respectively.

In such a permanent magnet rotor assembly, the end plates are placed in contact with the yokes and the permanent magnets, and are fastened to the opposite ends of the yokes, respectively, with stud bolts or fastening bolts penetrating the yokes. Therefore, the end plates must be formed of a nonmagnetic material, such as a stainless steel, to prevent a short-circuiting of the magnetic paths through the end plates.

On the other hand, the end plates must be firmly secured to the rotor shaft. Accordingly, it has been a conventional practice to form an end plate integrally with a boss having a large wall thickness, by casting and/or machining and to secure the end plate to a rotor shaft by fitting the rotor shaft in the boss by a shrinkage fit. However, since nonmagnetic materials, in general, are expensive, forming an end plate integrally with a boss having a large wall thickness of a non-magnetic material is very costly.

It is possible to secure an end plate having a boss having a small wall thickness and formed of a nonmagnetic material to a rotor shaft by welding the boss to the rotor shaft. This method reduces the cost of the end plate and can secure the end plate firmly to the rotor shaft, but this method will possibly cause thermal deformation of the rotor shaft, which deteriorates the rotational accuracy of the rotor assembly.

Accordingly, it has been desired by the industry to develop a permanent magnet rotor having inexpensive end plates which can secured firmly to the rotor shaft without deteriorating the rotational accuracy of the rotor assembly.

DISCLOSURE OF THE INVENTION

The present invention provides a permanent magnet rotor assembly comprising a rotor shaft, a plurality of yokes arranged around the rotor shaft at circumferential intervals and extending along the axis of the rotor shaft, permanent magnets each being held between the two adjacent yokes, a pair of end plates attached to the opposite ends of the yokes, respectively, each end plate being formed of a non-magnetic material and having in the central portion thereof a boss capable of fitting on the rotor shaft, the boss being secured to the rotor shaft by the compressive force of a fastening ring fitted on the boss by a shrinkage fit.

In the permanent magnet rotor assembly according to the present invention, the boss of the end plate is secured firmly to the rotor shaft by the compressive force of the fastening ring. The fastening ring need not be formed of a nonmagnetic material, and hence the fastening ring is inexpensive. On the other hand, since the end plate formed of a non-magnetic material may have a small thickness, the end plate also is inexpensive. Furthermore, since the end plate can be secured to the rotor shaft without requiring a welding process, thermal deformation of the rotor shaft and deterioration of the rotational accuracy of the rotor assembly can be prevented.

Preferably, the boss of the end plate is formed by drawing. Therefore, the end plate can be easily manufactured at a low cost by using the least possible amount of a non-magnetic material.

The above and other features and advantages of the present invention will become more apparent from the following description taken in conjunction with the accompanying drawings.

BEST MODE FOR CARRYING OUT THE INVENTION

Figure 1:
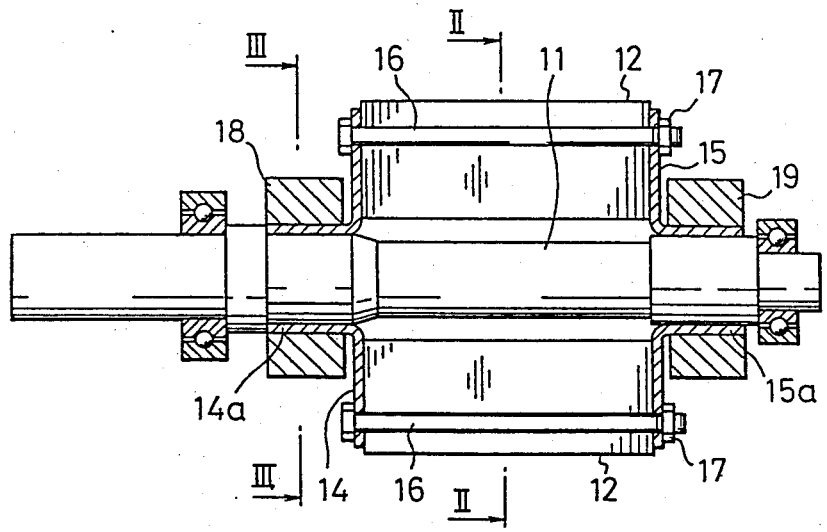
FIG. 1 is a longitudinal sectional view of a permanent magnet rotor assembly, in a preferred embodiment, according to the present invention.
Figure 2:
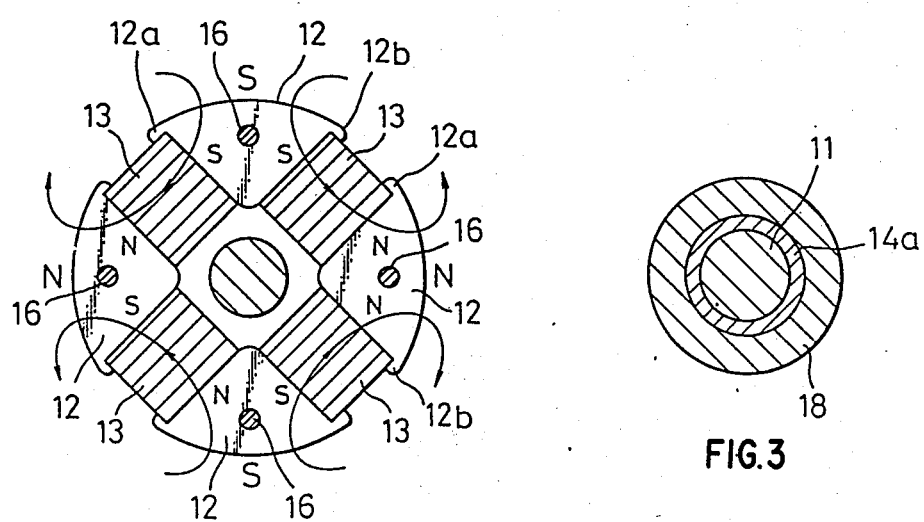
FIG. 2 is a sectional view taken on line II—II in FIG. 1.
Figure 3:
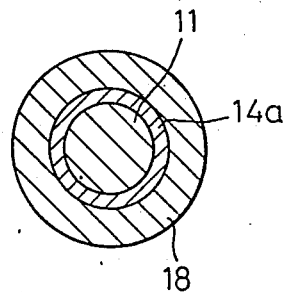
FIG. 3 is a sectional view taken on line III—III in FIG. 1.

Referring to FIGS. 1 to 3 showing a preferred embodiment of the present invention, a permanent magnet rotor assembly has a rotor shaft 11. Four yokes 12 extending axially of the rotor shaft are arranged around the rotor shaft at circumferential intervals. Each yoke 12 consists of a plurality of thin electromagnetic steel plates laminated along the axial direction.

Permanent magnets 13 of rectangular cross section are extended in the axial direction and are held between the two adjacent yokes 12, with the longer sides thereof extended radially. The electromagnetic steel plates forming the yokes 12 each have a substantially sectorial shape and are provided at the opposite ends of the outer edges thereof with projections 12a and 12b which engage the outer corners of the permanent magnet 13 to restrain the same from radially slipping out of position.

The permanent magnets 13 each have magnetic poles of opposite sense, namely, an N-pole and an S-pole, in the circumferentially opposite sides thereof. The permanent magnets 13 are arranged so that the same magnetic poles of the two adjacent permanent magnets 13 are disposed on the opposite sides of each yoke 12. Accordingly, the alternate yokes 12 form field poles of opposite polarity.

A pair of end plates 14 and 15 are provided on the axially opposite ends of the yokes 12. The end plates 14 and 15 are joined to the axially opposite ends of the yokes 12 by means of fastening bolts 16 inserted axially through the yokes 12, and nuts 17, respectively. Thus, the end plates 14 and 15 restrict the axial movement of the permanent magnets 13.

The end plates 14 and 15 are each formed of a thin non-magnetic plate, namely, a thin stainless steel plate. The end plates 14 and 15 have, in the respective central portions thereof, bosses 14a and 15a fitting the outer circumference of the rotor shaft 11.

The permanent magnet rotor assembly is provided with fastening rings 18 and 19 fitted on the bosses 14a and 15a of the end plates 14 and 15, respectively, by thermal insertion. When the fastening rings 18 and 19 are fitted on the bosses 14a and 15a of the end plates 14 and 15, respectively, by thermal insertion, the bosses 14a and 15a are secured firmly to the rotor shaft 11 by radial compressive pressure produced by the thermal shrinkage of the fastening rings 18 and 19.

An appropriate bond strength for securing the respective bosses 14a and 15a of the end plates 14 and 15 to the rotor shaft 11 is obtained by properly determining the wall thickness and the allowance of the fastening rings 18 and 19.

The fastening rings 18 and 19 need not be formed of a non-magnetic material, but may be formed of an inexpensive ferrous metal. Therefore, the fastening rings are manufactured at a low cost. On the other hand, since the end plates 14 and 15 are placed contiguously to the yokes 12, they must be formed of a non-magnetic material. However, since the respective entire portions of the end plates 14 and 15 including the bosses 14a and 15a each can be formed of thin plates of a non-magnetic material, the end plates 14 and 15 can be manufactured at a low cost. The bosses 14a and 15a of the end plates 14 and 15, in particular, can be easily formed at low cost, using the least possible amount of material by drawing a piece formed by punching a thin plate.

Thus, the respective bosses 14a and 15a of the end plates 14 and 15 are firmly secured to the outer circumference of the rotor shaft without welding. Accordingly, the deterioration of the rotational accuracy of the rotor assembly due to the thermal deformation of the rotor shaft is obviated.

Although the invention has been described with reference to a preferred embodiment thereof, the present invention is not limited to the foregoing embodiment, and many variations and changes are possible in the invention without departing from the scope thereof. For example, the respective numbers of the permanent magnets and the yokes, namely, the number of the poles of the rotor assembly, may be any appropriate integral number. Furthermore, each yoke may be a single metallic body.

CAPABILITY OF EXPLOITATION IN INDUSTRY

The permanent magnet rotor assembly according to the present invention is applicable to motors and generators of the permanent magnet type for various purposes.

We claim:

1. A permanent magnet rotor assembly comprising:
a rotor shaft;
a plurality of yokes arranged around the rotor shaft at circumferential intervals and extended along the axis of the rotor shaft;
permanent magnets extended along the axis of the rotor shaft and each held between two adjacent yokes;
a pair of end plates attached to axially opposite ends of the yokes, respectively, each of said end plates being formed of a non-magnetic material and being provided, in the central portion thereof, with a boss which is secured to the outer circumference of the rotor shaft by the compressive force of a fastening ring mounted thereon by thermal shrinkage insertion.

2. A permanent magnet rotor assembly as recited in claim 1, wherein the boss of each of said end plates is formed by drawing the central portion of a punched, circular thin stainless steel plate.

3. A permanent magnet rotor assembly as recited in claim 1, wherein said fastening ring is formed of a magnetic iron-bearing metal.

4. A permanent magnet rotor assembly as recited in claim 1, wherein each of said yokes consists of a plurality of thin magnetic steel plates which are laminated along the axial direction.

* * * * *